Patented Oct. 20, 1953

2,656,335

UNITED STATES PATENT OFFICE 2,656,335

RESIN AND PROCESS FOR ITS MANUFACTURE

Herman S. Bloch, Chicago, Ill., assignor to Universal Oil Products Company, Chicago, Ill., a corporation of Delaware No Drawing. Application June 14, 1951, Serial No. 231,667

13 Claims. (Cl. 260—50)

1

This application is a continuation-in-part of my copending application Serial Number 782,022, filed October 24, 1947, now patent No. 2,558,812, which in turn is a continuation-in-part of my application Serial Number 534,155, filed May 4, 1944, and now abandoned.

This invention relates to the preparation of high molecular weight condensation products and resins which are useful in the manufacture of other resinous materials that may be used as coating compositions, may be molded into articles of manufacture or may be employed as binders for the production of molding cores and the like.

An object of this invention is to prepare a resin with high softening point, good strength, and hardness, and having improved adhesion to surfaces of wood and metals.

One embodiment of this invention relates to a process for producing a synthetic resin which comprises reacting in the presence of a strong mineral acid catalyst a polyenic hydrocarbon, a phenol having at least 2 substitutable nuclear hydrogen atoms, and an aromatic hydrocarbon having at least 2 replaceable nuclear hydrogen atoms and alkyl groups of not more than 2 carbon atoms to form an organic condensation product and further reacting said condensation product with a carbonyl compound selected from the group consisting of an aldehyde and a ketone to form a resin.

Another embodiment of this invention relates to a process for producing a synthetic resin which comprises reacting in the presence of a strong mineral acid catalyst a polyenic hydrocarbon, a phenol having at least 2 substitutable nuclear hydrogen atoms, and an alkyl aromatic hydrocarbon which has at least 2 replaceable nuclear hydrogen atoms and in which said alkyl group contains not more than 2 carbon atoms to form an organic condensation product, separating said organic condensation product, unconverted reactants and catalyst from the resultant reaction mixture, reacting said condensation product in the presence of a catalyst with a carbonyl compound selected from the group consisting of an aldehyde and a ketone to form a resin, and recovering said resin from the reaction products.

A further embodiment of this invention relates to a process for manufacturing a resin which comprises reacting in the presence of a strong mineral acid catalyst a major proportion of a polyenic hydrocarbon and minor molecular proportions of a phenol having at least two nuclear hydrogen atoms and an alkyl aromatic

2 hydrocarbon having at least 2 nuclear hydrogen atoms and an alkyl group of not more than 2 carbon atoms, further reacting the resultant reaction mixture with a carbonyl compound selected from the members of the group consisting of an aldehyde and a ketone, stopping the reaction by treating the reaction mixture with a member of the group consisting of water and an aqueous alkaline solution and separating the resultant resinous product from unconverted organic materials and aqueous solution.

An additional embodiment of this invention relates to a process for the production of a resinous product which comprises reacting a mixture of arylalkyl phenols and arylalkenyl phenols with a carbonyl compound selected from the group consisting of the aldehydes and ketones in the presence of an acidic condensation catalyst at a temperature of from about 25° C. to about 200° C. and in the molar ratio of said carbonyl compound to said phenols of from about 0.5 to about 2, said phenols being the condensation product of a hydroxy aromatic hydrocarbon having at least 2 substitutable nuclear hydrogen atoms with both a polyenic hydrocarbon and an aromatic hydrocarbon having at least 2 replaceable nuclear hydrogen atoms and alkyl groups of not more than 2 carbon atoms.

The incorporation of a phenolic material in the resins of my invention results in an improvement over the analogous hydrocarbon resins with respect to solubility in oxygenated solvents, such as esters and ethers, as well as an increase in softening point, hardness, and strength of the finished resins. When employed in coating compositions the phenol-containing resins show improved adhesion to metals and woods and generally have more satisfactory durability than the purely hydrocarbon resins.

Broadly, my invention comprises preparing a resinous material having improved adhesive and coating qualities by reacting an aromatic hydrocarbon and a phenolic material with a polyene in the presence of an acidic catalyst, and further reacting the resultant reaction mixture with a carbonyl compound selected from the group consisting of an aldehyde and ketone.

The polyenic hydrocarbons preferred as starting materials in this process have two conjugated double bonds per molecule and include butadiene-1,3; isoprene; piperylene; cyclopentadiene; cyclohexadiene and other cyclic hydrocarbons having at least two double bonds per molecule. Such cyclic hydrocarbons include polycyclic unsaturated hydrocarbons having conjugated and also non-conjugated unsaturation and formed under the influence of strong acidic catalysts as sulfuric acid, hydrogen fluoride, etc. from aliphatic hydrocarbons and particularly from olefins.

The alkyl aromatic hydrocarbons used in this process should have at least two nuclear hydrogen atoms which may be replaced by reaction with polyolefins and phenols. These alkyl aromatic hydrocarbons include toluene, ethylbenzene, and other alkyl aromatic hydrocarbons having alkyl groups of not more than two carbon atoms. Alkylated naphthalene and other alkylated polycyclic hydrocarbons are also useful in the process but benzene, naphthalene and other polynuclear aromatics free from alkyl substituents generally yield resins which have low solubility in most organic solvents and accordingly, are less desirable in this process. Pure alkyl aromatic hydrocarbons may be used or a fraction containing alkyl aromatic hydrocarbons and substantially saturated hydrocarbons may be employed. Such hydrocarbon fractions containing alkyl aromatic hydrocarbons may boil in the range of gasoline, kerosene, or even heavier fractions.

The phenolic reactants of this process which include phenol, mono-alkylphenols, polyalkylphenols, cyclo-alkylphenols, arylphenols, and polynuclearphenols such as naphthols and tetrahydronaphthols have at least two and better 3 or 4 hydrogen atoms combined with carbon atoms of the phenolic ring in order to produce a high melting resin. A phenol having 3 or 4 readily replaceable nuclear hydrogen atoms is not only able to react with diolefinic and aromatic hydrocarbons to form long chain resin molecules, but this resin may be reacted further with aldehydes and ketones as hereinafter set forth.

The aromatic hydrocarbon fraction charged to the process should contain at least 10% of usable alkyl aromatic hydrocarbons and should be substantially free from non-alkylated aromatics. The lower limit of the proportion of phenols charged should be at least about 10 mole per cent of the total of alkyl aromatic hydrocarbons and phenols. This lower limit of phenol proportion is essential so that the finished resin (which may vary in molecular weight from about 500 to about 1500) may have incorporated therein an average of at least one phenolic nucleus per molecule. The total amount of phenolic material present in the reaction mixture should be not more than about 50 mole per cent of the total of the alkyl aromatic hydrocarbons plus phenols contained in the mixture. In forming the resin of this process, the preferred molecular ratio of polyene to the total of alkyl aromatic hydrocarbons plus phenols is generally about one if dienes are used or this ratio is less than one if the polyenes are more unsaturated than the dienes. If a hard-finish resin is desired, a little more than a mole, i. e., about 1.5 moles per mole of aromatic are used. If, however, it is desired to produce a soft resinoid which is to be further reacted, as for example, with formaldehyde, the mole to mole ratio is preferred. By reacting the resinoid with formaldehyde or other aldehydes or ketones, harder thermosetting resins may be prepared.

Aldehydes and ketones suitable for use in this process may be aliphatic or cyclic and of either saturated or unsaturated structure. Also the cyclic carbonyl compounds may be either cycloparaffinic or aromatic. Suitable ketones include such saturated members as acetone, methylethyl ketone, diethyl ketone, etc.; cyclic saturated ketones, such as methylcyclohexyl ketone; cyclic members wherein the carbonyl group is part of the ring, such as cyclohexanone; unsaturated ketones, such as vinyl methylketone, ethylideneacetone, mesityl oxide, phorone, isophorone, etc.; aryl ketones, such as acetophenone, butyrophenone, benzophenone, etc.; alkenyl arylketones, such as propenyl phenyl ketones; polyketones, such as diacetyl or benzil and homologs of the above classes. Typical aldehydes of the corresponding classes enumerated above include such compounds as formaldehyde and acetaldehyde of the saturated aliphatic series, crotonaldehyde or acrolein of the unsaturated aliphatic series, benzaldehyde or cinnamaldehyde of the arylaldehydes, and heterocyclic aldehydes such as furfural. The polymers of formaldehyde such as trioxymethylene are particularly useful since the latter are liquid at elevated temperatures and depolymerize during the reaction to yield the highly active carbonyl compound, formaldehyde. The aldehydes and ketones may also be employed in admixture with each other or with members of the same group. The carbonyl reactant may also contain diverse radicals other than the carbonyl group attached to other carbon atoms in the structure of the compound than the carbonyl carbon atoms, thereby introducing various modifications in the properties of the ultimate resinous product. Such other radicals may be one or more of the following group: halogen, nitro, amino, alkoxy, acyloxy, carboxy, carboxamide, or sulfonic acid radicals, which, although they do not enter into the condensation reaction directly with the hydroxy aromatic compound (i. e., are not phenol-reactive), nevertheless affect the melting point, solubility and other characteristics of the resin. In general, when utilizing an unsaturated carbonyl compound, as for example, a ketone or aldehyde wherein the carbonyl group is attached to an alkenyl residue, the products tend to have somewhat different properties than resins prepared from the corresponding saturated carbonyl reactants containing the same number of carbon atoms. As a rule, the products derived from the unsaturated series of reactants tend to have higher melting points due, it is believed, to incidental polymerization effects obtained between the double bonds of said reactants.

In the first step of this process the reactants are charged in the proportions of from about 5 to about 25 mols of phenols from about 25 to about 45 mols of alkyl aromatic hydrocarbons and from about 50 to about 75 mols of polyenes, the latter preferably conjugated alkadienes. Accordingly, a typical reaction mixture contains from 10 to 50 molecular proportions of a phenol or phenol mixture, from 90 to 50 molecular proportions of xylenes, ethylbenzene or other suitable aromatic hydrocarbon or aromatic hydrocarbon mixture, and from 100 to 150 molecular proportions of polyenic hydrocarbon such as butadiene-1,3. If less dienic or other polyenic hydrocarbon is present in the reaction mixture than that needed to react with the aromatic hydrocarbons as well as the phenols the resultant resin will contain substantial amounts of a phenol-polyene condensation product which may be liquid. When the specified proportions of the three reactants are present, much better yields of a hard resin are formed by the interaction of all three of these resin components, namely phenol, alkyl aromatic hydrocarbon and polyene. It appears that the phenols react more rapidly than the alkyl aromatics with the polyenic hydrocarbons and accordingly the use of a higher molecular proportion of polyene than phenol promotes formation of the three-component resin of this process.

Strong mineral acids which are suitable as catalysts for the first step of this process comprise sulfuric acid, phosphoric acid and hydrofluoric acid. These different catalysts are not necessarily employed at the same conditions of operation nor are equivalent results obtained in their presence. The sulfuric acid catalyst preferably contains at least 90% by weight of $H_2SO_4$, the remainder being water, but the catalyst should contain 95% or more of $H_2SO_4$ in order to promote high reaction efficiency. Hydrogen fluoride catalyst which is also referred to as hydrofluoric acid should also contain at least 90% by weight of HF and preferably more than 95% by weight of HF. Phosphoric acids containing about 90% by weight of $H_3PO_4$ may also be used, but a higher yield of resin is obtained when employing a phosphoric acid catalyst of higher concentration.

In carrying out the first step process of this invention, the mixture of phenol and the aromatic hydrocarbons or the hydrocarbon fraction containing aromatics is commingled with a stoichiometric equivalent or excess of polyenic hydrocarbon and heated in the presence of the catalyst at a temperature usually below about 150° C. but generally in the range of 0° to 50° C. The reaction mixture is then treated with water or an aqueous solution of an alkali for the purpose of inactivating the catalyst, stopping the reaction, and decomposing the complexes of catalyst with organic material. When using sulfuric acid catalyst, a refluxing treatment of the organic aqueous two phase system decomposes the emulsifying sulfonic acids and assists in the separation of the resinous product from the uncondensed organic material and the aqueous phase. The last step can be done by steam-distilling the two phase system and subsequently separating the resinous residue from the aqueous phase, or by first separating the aqueous phase and then vacuum-distilling or steam-distilling the organic phase; the exact order or manner of procedure is generally unimportant. After the unreacted material and water are removed from the plastic residue as by heating at 90° to 200° C. and the plastic residue is permitted to cool, it sets quickly to form a clear, pale resin having good solubilities in aromatic hydrocarbons, chlorinated hydrocarbons, and higher members of the series of lacquer solvents of the ester, ketone, glycol-ester, and glycol-ester types.

The separation of olefin polymers and unreacted material such as excess polyene, phenol or non-aromatic hydrocarbons (in cases wherein naphtha fractions are employed instead of pure hydrocarbons) is preferably effected by steam distillation rather than by ordinary distillation unless the latter is carried out at subatmospheric pressure. Distillation at atmospheric pressure causes darkening of the resinous product.

When anhydrous hydrogen fluoride is employed as the catalyst for the reaction, the reaction products may be decomposed by heat and the substantially anhydrous hydrogen fluoride recovered for further use. The remaining material is treated as before to remove unreacted components and olefin polymers and the plastic residue freed from water to yield the desired resin.

In an alternative method of procedure, the phenol is added to the reaction mixture after partial condensation has been effected between the aromatic hydrocarbon and the polyenic material. Less catalyst is needed when following this method of operation but greater care is required to insure a homogeneous product having satisfactory properties.

The composition and properties of the resin prepared according to the method hereinabove set forth may be varied if, instead of or together with the phenol, other substituted aromatic compounds are employed. These compounds include aromatic amines or simple derivatives thereof, aromatic carboxylic acids or their simple derivatives, aromatic alcohols or derivatives thereof, aromatic aldehydes or their acetals, aromatic nitro or nitroso compounds or aromatic sulfonic acids or their simple derivatives.

The resinous condensation product formed as hereinabove set forth by reacting a phenol, an alkyl aromatic hydrocarbon and a polyenic hydrocarbon in the presence of a strong mineral acid catalyst may be regarded as a mixture of arylalkyl phenols and arylalkenyl phenols formed by the condensation of an aromatic hydrocarbon and a phenol with a diolefin, a diolefin polymer or other polyolefin to form a high molecular weight condensation product. Such a mixture of arylalkyl phenols and arylalkenyl phenols is then reacted further with a carbonyl compound selected from the group consisting of an aldehyde and a ketone to produce a higher molecular weight condensation product which is useful as a thermosetting resin and as a surface coating material. The condensation of a carbonyl compound selected from the group consisting of an aldehyde and a ketone with the reaction product obtained in the first step of this process is preferably carried out in the presence of a catalyst selected from the group consisting of acid-acting substances and basic substances. The acid-acting substances are selected from either the organic or mineral acids, including such acids as acetic, chloroacetic, citric and oxalic acids, various sulfonic acids, such as ethanesulfonic acid, etc. of the former class and hydrochloric, sulfuric, phosphoric, etc. acids of the mineral acid class of catalysts. The catalyst is introduced into the reaction mixture in sufficient quantity to result in a slightly acidic reaction mixture, generally in amounts of from about 0.1 to about 10 weight per cent of the reaction mixture. When utilizing mineral acid catalysts, the quantity of catalyst is generally less than about 5%, whereas organic acids may be present in amounts up to about 10% of the reaction mixture. The catalyst may be subsequently removed from the resinous product by contacting the resinous reaction mixture with a solvent which has a selective solubility for the catalyst, such as water containing a base or alkali, or the resin may be dissolved away from the catalyst, as for example, by contacting the resin containing the catalyst with a hydrocarbon such as benzene which dissolves the resin but not the catalyst.

The condensation reaction may be conducted in the presence of a solvent for the reactants, the solvent tending to modify the rate of reaction and the character of the products obtained therefrom. In general, the aliphatic alcohols such as butyl alcohol, ethers, such as diethylether, esters, such as ethylacetate, halogenated hydrocarbons, such as ethylene dichloride or trichloroethylene, and hydrocarbon solvents (particularly the aromatics such as benzene, toluene, etc.) provide suitable solvents or diluents in which to conduct the reaction. The solvent may be added for the specific purpose of controlling the rate of reaction, as for example, where a solvent is chosen which vaporizes at the reaction temperature and thus maintains its temperature at the boiling point of the solvent. The solvent may also form an azeotrope with the by-product water formed in the reaction and thus provide an effective means for removing the latter undesirable product from the reaction mixture.

The resin-forming reaction of the present process may be effected at temperatures of from about 25° to about 200° C. and preferably from about 40° to about 125° C. and at pressures sufficient to maintain the reactants in substantially liquid phase. The proportion of carbonyl compound to the condensation product formed from a phenol, an aromatic hydrocarbon and a polyene utilized in the reaction mixture may vary from about 0.5 to about 2 molecular proportions thereof. It is generally preferred to maintain the molecular ratio of carbonyl compound to the previously formed condensation product within the range of from about 0.7 to about 1.2 as the resinous product obtained thereby generally possesses more desirable characteristics. In general, lowering said above ratio results in the production of a soft resinous material whereas increasing the ratio tends to produce resins of hard, brittle characteristics. Within the range specified, the resins may vary from soft resins or fluid resinoids to hard, tough elastic products, depending upon the degree of condensation desired for the particular use intended. In either case, the resins possess the ability to condense and polymerize further by the action of heat and pressure with or without polymerization catalysts such as peroxides, organic acids, or acid-acting salts like zinc chloride.

The residual unsaturation contained in the resinous products is believed to account for the ability of the resins to undergo further polymerization under the influence of heat and pressure, etc. For similar reasons, the products may be vulcanized in the presence of sulfur when subject to heat and pressure in the presence of suitable accelerators. Because of the unusual combination of properties found in the present resinous products, they should find wide use as molding materials, coatings, rubber additives, adhesives and impregnants for cloth, wood and paper, as for example in the manufacture of laminated products. The quality of the resins may be varied within wide limits to secure products of almost any specified properties varying in hardness, solubility, setting time, etc. by the regulation of the reactant ratios in the condensation reaction, the type and boiling range of the phenols, aromatic hydrocarbons and polyolefinic hydrocarbons, the type of carbonyl compound, the nature and amount of catalyst used, the degree of reaction, etc. Further variations may be obtained by blending the resultant resinous products with resins of other types, especially urea-aldehyde, melamine-aldehyde, and other phenolic resins.

As hereinabove set forth the second step of the process, that is the further reaction of a carbonyl compound with the condensation product of a phenol, an aromatic hydrocarbon and a polyenic hydrocarbon may be carried out in the presence of a basic catalyst in a manner similar to that employed when utilizing either an organic acid or mineral acid catalyst. The basic catalysts employed in this step of the process comprise organic and inorganic bases and particularly basic nitrogen compounds. Such basic nitrogen compounds include ammonia, an amine, a hetero- cyclic nitrogen base and the like. The amines include primary, secondary and tertiary aliphatic amines such as alkyl amines and alkenyl amines, cycloalkyl amines, aryl amines, aralkyl amines, and the like. The heterocyclic nitrogen compounds which are useful as basic catalysts in the second step of this process include pyridine, the picolines, the lutidines, quinolines, etc.

The following examples are introduced to illustrate the process of this invention but are not to be construed as unduly limiting the broad scope of the invention.

*Example I*

159.1 grams of xylenes and 47.05 grams of phenol were combined and introduced to a reactor equipped with a stirring device. The reactor was chilled and 102 grams of 96% sulfuric acid was added. 120 grams of butadiene was introduced slowly to the reaction mixture which was maintained at a temperature of 5° to 10° C. for six hours. Water was then added to the reaction mixture which was then heated under reflux for one hour (during which sulfonic acids were decomposed), and the entire mixture was then steam-distilled to remove any unreacted xylenes and phenol. The steam-distillate was a water-white aromatic liquid containing 82% of xylenes. The residue from the steam-distillation after being freed from water by vacuum-distillation was a resinous solid with a softening point (ball and ring) of 131° F. The resinous solids so obtained weighed 225.5 grams.

45.4 grams of the condensation product formed from the above condensation of xylenes, phenol, and butadiene dissolved in ethylene dichloride employed as solvent was mixed with 3.5 grams of trioxymethylene (an amount sufficient to provide slightly over a molar equivalent of formaldehyde) in the reaction mixture. To this mixture 1% by weight of oxalic acid was added as catalyst and the resultant mixture was heated to a temperature of approximately 55° C. for a time of 2 hours. A viscous reaction product soon formed which on further reaction at the indicated conditions produced a flexible but tough and hard resinous mass. This material could be subjected to vulcanization and consequent further hardening by incorporating from 1 to 10% by weight of sulfur therein and heating under pressure at a temperature of 150° C. for 1½ hours.

*Example II*

A mixture of 159.1 grams of xylenes, 47.05 of phenol, and 120 grams of butadiene was reacted in the presence of 93 grams of phosphoric acid (90% $H_3PO_4$ and 10% water). At temperatures up to 50° C., reaction was comparatively slow and yields were quite small, but at higher temperatures the reaction occurs more rapidly and better yields were obtained. The products of reaction were treated as in Example I to recover a resinous product similar to that formed when sulfuric acid was used as the catalyst. 45.4 grams of the resinous product obtained in this run and 15.2 grams of isophorone were heated at a temperature of 110° C. for 4 hours in the presence of 0.2% by weight of concentrated phosphoric acid to form a hard resinous mass which was then washed with water and caustic to remove phosphoric acid catalyst. The water washed and caustic washed resinous reaction product was then dried to give a material found suitable for molding into plates, bars and other objects.

Example III

In this run, 201 grams of hydrogen fluoride was used as the catalyst for the reaction of a mixture of 212 grams xylenes, 63 grams phenol and 149 grams of butadiene; the latter was added gradually over a period of two hours. The reaction was conducted at a temperature of from about 7° to about 13° C. and maintained at that temperature while 52 grams of crotonaldehyde was added thereto with stirring. The resultant reaction mixture which contained hydrogen fluoride catalyst was then poured into a mixture of ice and water in order to separate hydrogen fluoride from the resultant resinous reaction product. Further washing of the resinous material with water and caustic soda solution and separation of volatile material gave a substantially hydrogen fluoride-free resin which was then dried and molded into plates, rods and the like having high tensile and impact strength.

Example IV 68.1 grams of the xylene-phenol-butadiene resinoid recovered as an intermediate in Example I was refluxed for two hours with 0.25 mols of formalin (added as 35% aqueous formaldehyde) in the presence of 0.005 mol of sodium hydroxide. The product gradually hardened during this period, and at the end of this period formed a firm solid which was rendered quite hard by curing at 150° C. A similar product was obtained when an equivalent amount of ammonia was used as catalyst instead of sodium hydroxide, but six hours were required for the condensation.

I claim as my invention:

1. A process for producing a synthetic resin which comprises reacting a carbonyl compound selected from the group consisting of aldehydes and ketones with the condensation product of from about 5 to about 25 mols of a phenol having at least two nuclear hydrogen atoms, from about 25 to about 45 mols of an aromatic hydrocarbon having at least two nuclear hydrogen atoms and an alkyl group of not more than two carbon atoms, and from about 50 to about 75 mols of a conjugated aliphatic diene hydrocarbon.

2. The process of claim 1 further characterized in that said reaction is terminated by treating the reaction mixture with a member of the group consisting of water and an aqueous alkaline solution.

3. The process of claim 1 further characterized in that said carbonyl compound and condensation product are catalytically reacted at a temperature of from about 25° to about 200° C.

4. A process for producing a synthetic resin which comprises reacting a carbonyl compound selected from the group consisting of aldehydes and ketones with the condensation product of from about 5 to about 25 mols of phenol, from about 25 to about 45 mols of xylene, and from about 50 to about 75 mols of butadiene-1,3.

5. The resinous reaction product of a carbonyl compound selected from the group consisting of aldehydes and ketones with the condensation product of from about 5 to about 25 mols of a phenol having at least two nuclear hydrogen atoms, from about 25 to about 45 mols of an aromatic hydrocarbon having at least two nuclear hydrogen atoms and an alkyl group of not more than two carbon atoms, and from about 50 to about 75 mols of a conjugated aliphatic diene hydrocarbon.

6. The process defined in claim 1 further characterized in that said carbonyl compound is formaldehyde.

7. The process defined in claim 1 further characterized in that said carbonyl compound is crotonaldehyde.

8. The process defined in claim 1 further characterized in that said carbonyl compound is isophorone.

9. The process of claim 1 further characterized in that said carbonyl compound and said condensation product are reacted in the presence of an acidic condensation catalyst.

10. The process of claim 1 further characterized in that said carbonyl compound and said condensation product are reacted in the presence of oxalic acid.

11. The process of claim 1 further characterized in that said carbonyl compound and said condensation product are reacted in the presence of hydrofluoric acid.

12. The process of claim 1 further characterized in that said carbonyl compound and said condensation product are reacted in the presence of phosphoric acid.

13. The resinous reaction product of a carbonyl compound selected from the group consisting of aldehydes and ketones with the condensation product of from about 5 to about 25 mols of phenol, from about 25 to about 45 mols of xylene, and from about 50 to 75 mols of butadiene-1,3.

HERMAN S. BLOCH.

References Cited in the file of this patent

UNITED STATES PATENTS

| Number | Name | Date |
| --- | --- | --- |
| 2,154,192 | Zinke | Apr. 11, 1939 |
| 2,343,845 | Powers | Mar. 7, 1944 |
| 2,378,436 | Rummelsburg | June 19, 1945 |
| 2,471,453 | Rummelsburg | May 31, 1949 |
| 2,558,812 | Bloch | July 3, 1951 |